United States Patent
Schupp et al.

(10) Patent No.: US 9,619,714 B2
(45) Date of Patent: Apr. 11, 2017

(54) DEVICE AND METHOD FOR VIDEO GENERATION

(71) Applicant: SONY CORPORATION, Tokyo (JP)

(72) Inventors: William Schupp, San Diego, CA (US); Hiroki Takakura, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 14/850,769

(22) Filed: Sep. 10, 2015

(65) Prior Publication Data
US 2017/0076154 A1    Mar. 16, 2017

(51) Int. Cl.
*H04N 5/235*  (2006.01)
*G06K 9/00*  (2006.01)
*G11B 27/036*  (2006.01)

(52) U.S. Cl.
CPC ........ *G06K 9/00744* (2013.01); *G11B 27/036* (2013.01)

(58) Field of Classification Search
CPC ................................................. G06K 9/00744
See application file for complete search history.

(56) References Cited

U.S. PATENT DOCUMENTS

| | | | |
|---|---|---|---|
| 8,064,759 B1 | 11/2011 | Kahn et al. | |
| 8,077,213 B2 * | 12/2011 | Gulliksson | H04N 5/232 348/218.1 |
| 8,515,270 B1 | 8/2013 | Posehn | |
| 8,675,049 B2 * | 3/2014 | Kopf | H04N 13/0059 345/419 |
| 2007/0236561 A1 * | 10/2007 | Anai | G06T 7/0044 348/46 |
| 2009/0259976 A1 * | 10/2009 | Varadhan | G06T 15/20 715/850 |
| 2009/0262202 A1 | 10/2009 | Leonard | |

OTHER PUBLICATIONS

Eric P. Bennett et al, "Computational Time-Lapse Video", (http://csbio.unc.edu/mcmillan/pubs/sig07_Bennett.pdf), May 3, 2007, The University of North Carolina at Chapel Hill, US.
Kalpesh Kunvar et al, "Performance Evaluation and Comparison of Pixel to Pixel Bit Mapping and Edge Detection Algorithm for Generation of Differential Time Lapse Video", Emerging Technology Trends in Electronics, Communication and Networking (ET2ECN), 2012 1st International Conference, Dec. 19-21, 2012, pp. 7, Print ISBN: 978-1-4673-1628-6,IEEE, Surat, Gujarat, India.

* cited by examiner

*Primary Examiner* — Gary C Vieaux
(74) *Attorney, Agent, or Firm* — Chip Law Group

(57) ABSTRACT

Various aspects of a method and device for video generation are disclosed herein. The method includes determination of direction and location information of the device in motion for a plurality of captured video frames. Based on the determined location information, a path of the device in motion is generated. For a captured video frame from the plurality of captured video frames, an angle between a first vector and a second vector is calculated. The first vector corresponds to the determined direction information associated with the captured video frame. The second vector corresponds to the generated path. The method further includes selection of the captured video frame, for the generation of the video, based on at least the calculated angle.

21 Claims, 8 Drawing Sheets

DEVICE AND METHOD FOR VIDEO GENERATION

FIELD

Various embodiments of the disclosure relate to a device and method for video generation. More specifically, various embodiments of the disclosure relate to device and method for video generation based on captured video frames and sensor data associated with each of the captured video frames.

BACKGROUND

Recent advancements in the field of sensor technology and video generation techniques have extended the functionalities of various video-capturing devices and associated applications. Portable video-capturing devices, such as a wearable video camera, may be used to record an action video while a user moves along a path to record the action video.

In certain scenarios, the recorded action videos may comprise replicated video frames. Due to such replicated video frames, the recorded action video may be very lengthy and tiresome to watch. In other scenarios, due to the movement of the user wearing the wearable video camera, the recorded action video may not be stable, and thus, may be "shaky" and may not provide a seamless viewing experience. In such scenarios, conventional video frame sampling techniques may be used to remove certain video frames from the recorded action video. However, the output video obtained may still not provide a seamless viewing experience. Such output videos are usually referred to as a "choppy time-lapse videos". Further, various post-processing techniques may be implemented to remove selective unwanted replicated video frames from the recorded action video. However, such post-processing techniques usually require huge computational resources, and thus may be impractical for consumer use. It may be desirable that an efficient and a simplified technique is provided to generate a high quality and stabilized action video by the portable video-capturing device that enhances the viewing experience of the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device and a method for video generation are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
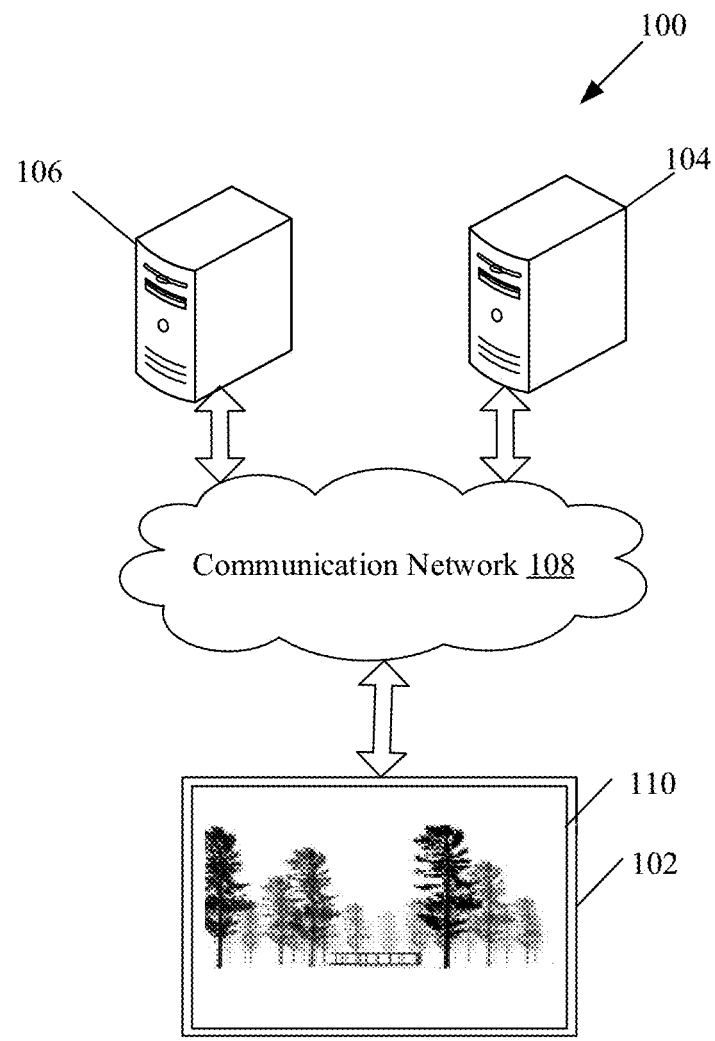
FIG. 1 is a block diagram that illustrates a network environment to implement the disclosed device and method for video generation, in accordance with an embodiment of the disclosure.

Various implementations may be found in a device and/or method for video generation. Exemplary aspects of the disclosure may comprise a method for video generation that includes determination of direction and location information of a device in motion for a plurality of captured video frames. A path of the device in motion may be generated, based on the determined location information. Further, an angle may be calculated between a first vector and a second vector for a captured video frame from the plurality of captured video frames. The first vector may correspond to the determined direction information associated with the captured video frame. The second vector may correspond to the generated path. Based on at least the calculated angle, the captured video frame may be selected for generation of a video.

In accordance with an embodiment, a composite video frame may be generated for a location along the generated path. The device may generate the composite video frame in absence of a video frame at the location along the generated path. The composite video frame may be generated based on at least two video frames captured at the location or in a vicinity of the location. Each of the two captured video frames may include at least a part of one or more common objects. Further, the device may utilize the direction information associated with each of the at least two captured video frames for the generation of the composite video frame. Further, the device may utilize the generated composite video frame for the generation of the video.

In accordance with an embodiment, at least one captured video frame may be selected from a group of consecutively captured video frames along the generated path. The device may select the at least one captured video frame to generate the video when the location information associated with each of the group of consecutively captured video frames is detected unchanged or is below a first threshold value. Further, the device may select the at least one captured video frame from the group of consecutively captured video frames when each of the group of consecutively captured video frames includes at least one common object.

In accordance with an embodiment, the captured video frame may be selected from the plurality of captured video frames, based on at least a change in a focal distance parameter associated with the captured video frame. The device may select the captured video frame when the change in the focal distance parameter of the captured video frame, with respect to a subsequent captured video frame, is equal to or below a second threshold value.

In accordance with an embodiment, the generated path may correspond to a linear path. One or more video frames from the plurality of captured video frames may be selected between a start location and a target location along the linear path when the calculated angle for each of the plurality of captured video frames is zero. In accordance with an embodiment, the generated path may correspond to a non-linear path. The plurality of captured video frames may be selected between the start location and the target location along the non-linear path when the calculated angle for each of the plurality of captured video frames is equal to or below a pre-defined threshold angle.

In accordance with an embodiment, the direction and location information may be determined, based on sensor data. The sensor data may correspond to one or more of a speed value, rate-of-change of speed, orientation of the device, global positioning system (GPS) data, geomagnetic sensor data, gyroscope sensor data, and/or other sensor data. The sensor data may be received from one or more sensors associated with the device. The one or more sensors may comprise one or more of an acceleration sensor, a gravity sensor, a gyroscope sensor, a linear acceleration sensor, and/or a geomagnetic field sensor.

FIG. 1 is a block diagram that illustrates a network environment 100 for video generation, in accordance with an embodiment of the disclosure. With reference to FIG. 1, there is shown a video-capturing device 102, a database server 104, an application server 106, and a communication network 108. The video-capturing device 102 may include the display screen 110. The video-capturing device 102 may be communicatively coupled with the database server 104 and the application server 106, via the communication network 108.

The video-capturing device 102 may comprise suitable logic, circuitry, interfaces, and/or code that may be configured to capture a plurality of video frames. The video-capturing device 102 may be configured to capture the plurality of video frames while attached to a non-stationary object, such as a moving vehicle. The video-capturing device 102 may be further configured to display the plurality of captured video frames on the display screen 110. The video-capturing device 102 may be further configured to receive one or more user input parameters provided by the user. The video-capturing device 102 may be further configured to download or extract an application to generate the video from the application server 106, via the communication network 108. The video-capturing device 102 may be further configured to generate the video, based on one or more of: the plurality of captured video frames, direction information, location information, and/or focal distance parameters associated with the plurality of captured video frames. The video-capturing device 102 may be further configured to display the generated video on the display screen 110. Examples of the video-capturing device 102 may include, but are not limited to, a single-lens reflex camera (SLR), a digital single-lens reflex camera (DSLR), a zoom-lens reflex (ZLR), a camcorder, a dashcam, a camera phone, a digital camera, a helmet camera, a webcam, a spy camera, an actioncam, a wearable camera, a smart-glass with an in-built camera, and/or other computing device associated with a camera.

The database server 104 may comprise suitable logic, circuitry, interfaces, and/or code that may be configured to store the plurality of captured video frames. The database server 104 may be further configured to store the sensor data. The sensor data may comprise direction and location information associated with the plurality of captured video frames. The database server 104 may be communicatively coupled with a remote electronic device, such as the video-capturing device 102. The database server 104 may be implemented by use of several technologies that are well known to those skilled in the art.

The application server 106 may comprise suitable logic, circuitry, interfaces, and/or code that may be configured to host an application to generate the video. The application server 106 may be configured to host the application for the one or more subscribed devices, such as the video-capturing device 102. The application server 106 may be communicatively coupled with the video-capturing device 102 and the database server 104. In accordance with an embodiment, the application server 106 may be configured to receive or extract the plurality of captured video frames from the video-capturing device 102 or the database server 104, via the communication network 108. The application server 106 may be implemented by use of several technologies that are well known to those skilled in the art.

A person with ordinary skill in the art will understand that the scope of the disclosure is not limited to the database server 104 and the application server 106 as separate entities. In accordance with an embodiment, the functionalities of the database server 104 and the application server 106 may be combined into a single server, without limitation of the scope of the disclosure.

The communication network 108 may include a medium through which the video-capturing device 102 may communicate with one or more servers, such as the database server 104 and/or the application server 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The display screen 110 may comprise suitable logic, circuitry, interfaces, and/or code that may be configured to display the plurality of captured video frames and the generated video. In accordance with an embodiment, the display screen 110 may be implemented as a part of the video-capturing device 102. The display screen 110 may be realized through several known technologies, such as Cathode Ray Tube (CRT) based display, Liquid Crystal Display (LCD), Light Emitting Diode (LED) based display, Organic LED display technology, Retina display technology, and/or the like.

In operation, the video-capturing device 102 may be configured to capture a plurality of video frames of a scene or an activity. In accordance with an embodiment, the video-capturing device 102 may be configured to capture the plurality of video frames when attached to a non-stationary object, such as a user or a vehicle in motion. For example, the video-capturing device 102, such as a wearable helmet camera, may be worn by the user trekking along a mountain. In another example, the video-capturing device 102 may be attached to a mirror, such as an outside rear-view mirror (ORVM), of the vehicle that may be travelling on a road. In accordance with an embodiment, the video-capturing device 102 may receive one or more user input parameters provided by the user. The one or more user input parameters, such as various threshold values and/or threshold angles are described in detail in FIG. 2.

In accordance with an embodiment, the video-capturing device 102 may further include one or more sensors. The one or more sensors may comprise one or more of an acceleration sensor, a gravity sensor, a gyroscope sensor, a linear acceleration sensor, a geomagnetic field sensor, and/or the like. The one or more sensors may be configured to measure the direction and location information of the video-capturing device 102 for the plurality of captured video frames. For example, the one or more sensors may be configured to measure a speed value, rate-of-change of the speed value, orientation, global positioning system (GPS) data, geomagnetic sensor data, and gyroscope sensor data, of the video-capturing device 102. The video-capturing device 102 may be further configured to transmit the plurality of captured video frames and the sensor data to the database server 104, via the communication network 108. Alternatively, the video-capturing device 102 may be configured to store the plurality of captured video frames and the sensor data in one or more memory units of the video-capturing device 102.

In accordance with an embodiment, the video-capturing device 102 may be configured to generate a path traversed by the video-capturing device 102 from a start location to a target location. In accordance with an embodiment, the path (that corresponds to the plurality of captured video frames) may be generated when the video-capturing device 102 captures one or more other video frames. The one or more other video frames may be captured at one or more subsequent locations. In accordance with an embodiment, the path (that corresponds to the plurality of captured video frames) may be generated when the video-capturing device 102 reaches the target location. In accordance with an embodiment, the video-capturing device 102 may generate the path, based on at least the location information of the video-capturing device 102 for the plurality of captured video frames at one or more locations between the start location and the target location. In accordance with an embodiment, the generated path may correspond to a linear path, a non-linear path, or a combination thereof. The generated path may correspond to the linear path when the video-capturing device 102 traverses along a line with zero curvature. The generated path may correspond to the non-linear path when the video-capturing device 102 traverses along a line with non-zero curvature.

In accordance with an embodiment, the video-capturing device 102 may be configured to calculate an angle between a first vector and a second vector. The first vector may correspond to the determined direction information of a video frame captured at a time instance and associated with a location along the generated path. In other words, the direction information of the captured video frame at the location and the time instance may be recorded sensor data (such as recorded compass direction data) that corresponds to the direction of the video-capturing device 102 at the location and the time instance. The second vector may correspond to the generated path. In accordance with an embodiment, the generated path may be a liner path or a non-liner path. In instances when the generated path is the linear path, the second vector may be a vector that corresponds to entire direction (or overall direction) of the generated path. In instances when the generated path is a non-linear path, the second vector may be a vector tangential to a curve of the generated path at the location along the generated path and at the time instance of the captured video frame. The video-capturing device 102 may be further configured to select the captured video frame, based on the calculated angle between the first vector and the second vector at the time instance. The video-capturing device 102 may be further configured to include the selected captured video frame in the generated video.

In accordance with an embodiment, the video-capturing device 102 may be configured to generate a composite video frame for a location along the generated path. The video-capturing device 102 may be configured to generate the composite video frame in absence of a video frame at the location along the generated path. The video-capturing device 102 may generate the composite video frame, based on at least two video frames captured at the location or in a vicinity of the location. In accordance with an embodiment, each of the at least two captured video frames may include at least a part of one or more common objects. In accordance with an embodiment, the video-capturing device 102 may be further configured to utilize the direction information associated with each of the at least two captured video frames to generate the composite video frame. Further, the video-capturing device 102 may be configured to include the generated composite video frame in the generated video.

In accordance with an embodiment, the video-capturing device 102 may be configured to select at least one captured video frame from a group of consecutively captured video frames. The video-capturing device 102 may select the at least one captured video frame when a location information associated with each of the group of consecutively captured video frames is detected unchanged or is below the first threshold value. The video-capturing device 102 may include the at least one captured video frame in the generated video.

In accordance with an embodiment, the video-capturing device 102 may be configured to select the captured video frame from the plurality of captured video frames, based on at least a focal distance parameter associated with each of the plurality of captured video frames. In accordance with an embodiment, the video-capturing device 102 may select the captured video frame when a change in focal distance parameter of the captured video frame with respect to at least one subsequent captured video frame is equal to or below the second threshold value. The video-capturing device 102 may include the at least one captured video frame in the generated video.

In accordance with an embodiment, the video-capturing device 102 may download or extract the application to generate the video from the application server 106, via the communication network 108. In accordance with an embodiment, the video-capturing device 102 may transmit the plurality of captured video frames and the associated sensor data to the database server 104 or the application server 106, via the communication network 108. After the receipt of the plurality of captured video frames and the associated sensor data, the application server 106 may utilize the application to generate the video.

Figure 2:
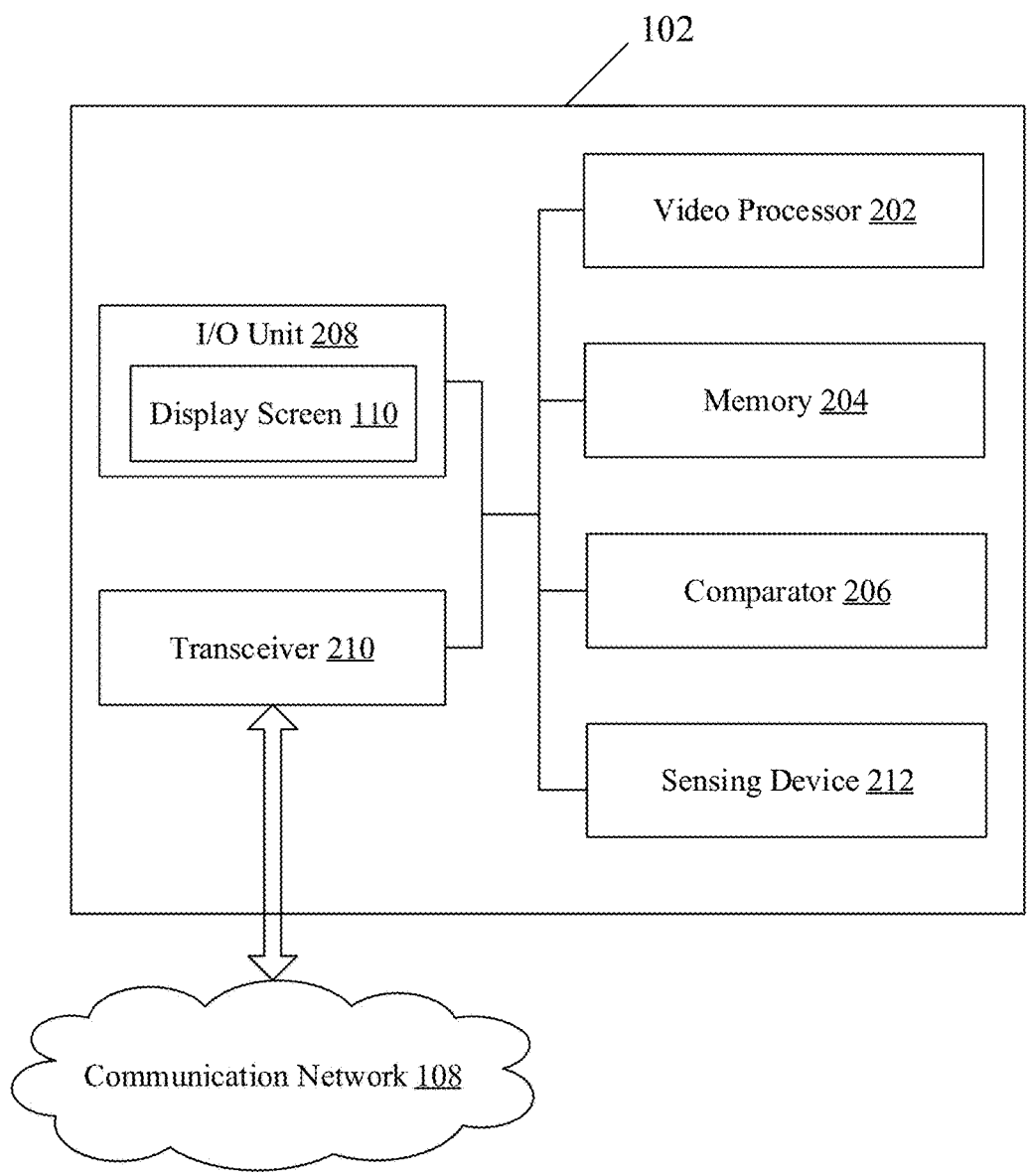
FIG. 2 is a block diagram that illustrates an exemplary video-capturing device, in accordance with an embodiment of the disclosure.

FIG. 2 is a block diagram 200 that illustrates an exemplary video-capturing device, in accordance with an embodiment of the disclosure. FIG. 2 is explained in conjunction with elements from FIG. 1. With reference to FIG. 2, there is shown the video-capturing device 102. The video-capturing device 102 may comprise one or more processors, such as a video processor 202, one or more memory units, such as a memory 204, and one or more comparators, such as a comparator 206. The video-capturing device 102 may further comprise one or more input/output (I/O) devices, such as an I/O unit 208, one or more transceivers, such as a transceiver 210, and one or more sensing devices, such as a sensing device 212. The I/O unit 208 may comprise a display screen 110. The video processor 202 may be communicatively coupled to the memory 204, the comparator 206, the I/O unit 208, the transceiver 210, and the sensing device 212.

The video processor 202 may comprise suitable logic, circuitry, interfaces, and/or code that may be configured to execute a set of instructions stored in the memory 204. The video processor 202 may be configured to process plurality of video frames captured by the video-capturing device 102, such as a camera or a camcorder. The video processor 202 may be further configured to retrieve a plurality of captured video frames, and sensor data, such as direction information, and/or location information of the video-capturing device 102, from the database server 104 or the memory 204. The sensor data may be retrieved to process the plurality of captured video frames. The video processor 202 may be further configured to generate a video, based on the plurality of captured video frames, and the retrieved sensor data, such as the direction and the location information. The video processor 202 may be implemented, based on a number of processor technologies known in the art. Examples of the video processor 202 may be an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or other processors.

The memory 204 may comprise suitable logic, circuitry, and/or interfaces that may be configured to store a machine code and/or a computer program that has at least one code section executable by the video processor 202. The memory 204 may be further configured to store the plurality of captured video frames. The memory 204 may be further configured to store the direction and the location information of the video-capturing device 102 for the plurality of captured video frames. The memory 204 may be further configured to store one or more user input parameters provided by the user. The memory 204 may be further configured to store one or more algorithms, such as a computer vision algorithm and/or a machine vision algorithm, and/or the like. Examples of implementation of the memory 204 may include, but are not limited to, Random Access Memory (RAM), Read Only Memory (ROM), Hard Disk Drive (HDD), and/or a Secure Digital (SD) card. It will be apparent to a person with ordinary skill in the art that the one or more algorithms stored in the memory 204 may enable the hardware of the block diagram 200 to perform one or more pre-defined operations.

The comparator 206 may comprise suitable logic, circuitry, and/or interfaces that may be configured to compare at least two input signals to generate an output signal. In accordance with an embodiment, the output signal may correspond to either "1" or "0". In accordance with an embodiment, the comparator 206 may generate an output "1" if a value of a first signal (from the at least two signals) is greater than a value of a second signal (from the at least two signals). Similarly, the comparator 206 may generate an output "0" if the value of the first signal is less than the value of the second signal. In accordance with an embodiment, the comparator 206 may be realized through either software technologies or hardware technologies known in the art.

The I/O unit 208 may comprise suitable logic, circuitry, interfaces, and/or code that may be configured to receive the one or more user input parameters from the user. The I/O unit 208 may also provide an output to the user. The I/O unit 208 may comprise various input and output devices that may be configured to communicate with the video processor 202. The I/O unit may comprise the display screen 110. Examples of the I/O unit 208 may include, but are not limited to, a keyboard, a mouse, a joystick, a touch screen, a touch pad, a microphone, a camera, a motion sensor, and/or a light sensor.

The transceiver 210 may comprise suitable logic, circuitry, interfaces, and/or code that may be configured to communicate with the video processor 202, the memory 204, the I/O unit 208, and/or the sensing device 212. Examples of the transceiver 210 may include, but are not limited to, an antenna, an Ethernet port, a USB port, or any other port that may be configured to receive and transmit data, such as the plurality of captured video frames or sensor data. The sensor data may include a measure of the direction and the location information of the video-capturing device 102 for the plurality of captured video frames. The transceiver 210 may receive and transmit at least the plurality of captured video frames and the sensor data in accordance with various communication protocols, such as the TCP/IP, the UDP, and 2G, 3G, or 4G communication protocols, through the I/O unit 208.

The sensing device 212 may comprise suitable logic, circuitry, and/or interfaces that may be configured to store a machine code and/or a computer program with at least one code section executable by the video processor 202. The sensing device 212 may comprise one or more sensors, such as an image sensor, acceleration sensor, gravity sensor, gyroscope sensor, linear acceleration sensor, and/or geomagnetic field sensor. The one or more sensors may be configured to measure and/or track the sensor data, such as a speed value, a rate-of-change of the speed value, an orientation, GPS data, geomagnetic sensor data, gyroscope sensor data of the video-capturing device 102, and/or the like.

In operation, the video processor 202 may be configured to capture a plurality of video frames of a scene or an activity. In accordance with an embodiment, the video-capturing device 102 may be configured to capture the plurality of video frames when the video-capturing device 102 is attached to an object. In an exemplary scenario, the object may be a user recording a video (while in motion), by use of the video-capturing device 102 or a non-stationary vehicle onto which the video-capturing device 102 may be installed or mounted. In another exemplary scenario, the video-capturing device 102 may be in motion while being attached to another object, such as a rope. In yet another exemplary scenario, the video-capturing device 102, such as a drone, may be in motion without being attached to any other object. In such scenarios, the non-stationary video-capturing device 102 may be configured to capture the plurality of video frames while in motion along a surface route and/or an aerial route.

In accordance with an embodiment, the video processor 202 may be further configured to determine the direction and the location information of the video-capturing device 102, for the plurality of captured video frames. The video processor 202 may be configured to utilize the sensor data, received from one or more sensors of the sensing device 212, to determine the direction and the location information. For example, the video processor 202 may utilize the sensor data received from a magneto-resistive navigational sensor, geographic position indicator, compass sensors, and/or the like, to determine the direction and the location information, such as "28.7 degree North and 77.03 degree East", of the video-capturing device 102.

Based on the plurality of captured video frames and the sensor data, the video processor 202 may be further configured to generate a path traversed by the video-capturing device 102. The video processor 202 may be configured to generate the path, based on the location information of the video-capturing device 102 for the plurality of captured video frames at different time instances. The location information may be determined based on the sensor data, such as GPS data of the video-capturing device 102 for the plurality of captured video frames at different time instances, to generate the path traversed by the video-capturing device 102. In an exemplary scenario, the video-capturing device 102 traverses along a path from a start location, such as a first location, at a first time instance. The video processor 202 may record the associated GPS data that indicates that the location information as, "$L_1$", plotted graphically in a path map. At a second time instance, the video-capturing device 102 may be at a second location, at a second time instance. The video processor 202 may record the associated GPS data that indicates that the location information as, "$L_2$", plotted graphically in the path map and a connected path from "$L_1$" and "$L_2$" may be represented. Similarly, at subsequent time instances, the video-capturing device 102 may be at subsequent locations, till the video processor 202 records the associated GPS data that indicates that the location information, "$L_n$", of a final location. "$L_n$" may be plotted graphically in the path map and a connected path from "$L_{n-1}$" and "$L_n$" may be represented. Thus, the video processor 202 may generate a complete path from the start location, "$L_1$", to the final location, "$L_n$", as the graphically represented path map.

In accordance with an embodiment, the generated path may correspond to a linear path. The generated path may correspond to the linear path when the video-capturing device 102 has traversed the path from the start location, such as "$L_1$", to the final location, such as "$L_n$", along a straight line with zero curvature. For example, the generated path may correspond to the linear path when a motion vector that corresponds to the motion of the video-capturing device 102 overlaps with the path traversed along the straight line between the start location, such as "$L_1$", and the final location, such as "$L_n$".

The video processor 202 may be configured to determine a directional angle, such as "$\theta_D$", that corresponds to the movement of the video-capturing device 102 along the generated path between the start location, such as "$L_1$", and the final location, such as "$L_n$", of the video-capturing device 102. The directional angle may be determined by the video processor 202, based on the sensor data provided by the compass sensors in the sensing device 212. The video processor 202 may be further configured to determine a camera angle, such as "$\theta_{C(Fi)}$", of a frame, "$F_i$", at a location, "$L_i$", and a time instance, "$T_i$". The comparator 206 may be configured to compare the camera angle, such as "$\theta_{C(Fi)}$", at the location, "$L_i$", and the time instance, "$T_i$", with the directional angle, such as "$\theta_D$".

In an instance, the comparison between the camera angle, such as "$\theta_{C(Fi)}$", and the directional angle, such as "$\theta_D$", may be successful. In such a case, the video processor 202 may be configured to select the captured video frame, "$F_i$". The video processor 202 may be further configured to include the selected video frame, "$F_i$", as one of the frames in the generation of the video.

In another instance, the comparison between the camera angle, such as "$\theta_{C(Fi)}$", of the frame, "$F_i$" (at the location, "$L_i$", and the time instance, "$T_i$") and the directional angle, such as "$\theta_D$", may not be successful. In such a case, the video processor 202 may be configured to discard the captured video frame, "$F_i$". The video processor 202 may be further configured to proceed to the next captured frame, such as "$F_{i+1}$", and again determine a camera angle, such as "$\theta_{C(Fi+1)}$", at a location, "$L_{i+1}$" and a time instance, "$T_{i+1}$". Subsequent steps (comparison and thereafter selection/discarding of the frame "$F_{i+1}$") for the frame, "$F_{i+1}$", may be similar to the steps for the frame, "$F_i$", as described above.

An exemplary scenario of the generated linear path has been explained later in conjunction with FIG. 3A.

In accordance with an embodiment, the generated path may correspond to a non-linear path. The generated path may correspond to the non-linear path when the video-capturing device 102 has traversed the path from the start location, such as "$L_1$", to the final location, such as "$L_n$", along a line with non-zero curvature. For example, the generated path may correspond to the non-linear path when a motion vector that corresponds to the motion of the video-capturing device 102 does not overlap with the path traversed along a straight line between the start location, such as "$L_1$", and the final location, such as "$L_n$".

In accordance with an embodiment, the video processor 202 may be configured to compute a first vector that may correspond to the direction of each video frame captured at different time instances. In accordance with an embodiment, the video processor 202 may be further configured to compute a second vector that may correspond to a tangential vector at a corresponding curvature of the non-linear path for each captured frame. The tangential vector may be determined at different locations at the different time instances from the generated path map.

In accordance with an exemplary scenario, the first vector, such as "$\theta_1$", of a video frame captured at a location, such as "$L_1$" may correspond to the determined direction of the captured video frame associated with the location, such as "$L_1$". For example, the video-capturing device 102 may capture the video frame, "$F_1$", along a direction, such as "20° N-E", at the location "$L_1$", such as "28°42' 0" N and 77° 1' 50" E". In such a case, the first vector, "$\theta_1$", may correspond to, "20° N-E". The second vector, such as "$\theta_2$", may correspond to a tangential vector to the generated path at the location, such as "$L_1$", of the captured video frame. For example, the direction of a tangent along the generated path at the same location "$L_1$", such as "28°42' 0" N and 77° 1' 50" E", is "29° N-E". In such a case, the second vector, "$\theta_2$", may correspond to, "29° N-E".

The video processor 202 may be configured to determine an angle between the first vector, "$\theta_1$" and the second vector, "$\theta_2$". In an instance, when the determined angle is less than or equal to a pre-defined threshold angle, the video processor 202 may be configured to select the captured video frame, "$F_1$". The video-capturing device 102 may be further configured to include the selected captured video frame, "$F_1$", in the generated output video.

In accordance with an embodiment, there may be multiple instances when the comparison between the camera angles of a plurality of consecutive frames, such as from "$F_j$" to "$F_{j+n}$" frames, at corresponding locations, such as "$L_j$" to "$L_{j+n}$", and time instances, such as "$T_j$" to "$T_{j+n}$", and the directional angle, such as "$\theta_D$", may not be successful. In such a case, the video processor 202 may discard the plurality of captured video frame, "$F_j$" to "$F_{j+n}$", at the plurality of consecutive locations, "$L_j$" to "$L_{j+n}$". In such a case, the video processor 202 may be configured to generate a composite video frame for the locations between "$L_j$" to "$L_{j+n}$", along the generated path.

In accordance with an embodiment, the video processor 202 may be configured to generate the composite video frame, based on the at least two captured video frames, "$F_{j-1}$" and "$F_{j+n+1}$", and corresponding direction associated with the locations, "$L_{j-1}$" and "$L_{j+n+1}$". In such a case, the at least two captured video frames, "$F_{j-1}$" and "$F_{j+n+1}$", may include at least a part of one or more common objects. Thus, the video processor 202 may be configured to utilize the at least two captured video frames and corresponding direction to generate the composite video frame.

A person with ordinary skill in the art will understand that the scope of the disclosure is not limited to the generation of the composite video frame, based on the at least two captured video frames, "$F_{j-1}$" and "$F_{j+n+1}$". The video processor 202 may utilize plurality of captured video frames from the plurality of captured video frame, "$F_j$" to "$F_{j+n}$", to generate the composite video frame. The video processor 202 may select one or more video frames from the plurality of captured video frames, "$F_j$" to "$F_{j+n}$", based on at least one common portion in the one or more common objects. An exemplary scenario of the generated composite video frame has been discussed later in conjunction with FIG. 3C.

In accordance with an embodiment, the video processor 202 may be configured to select the at least one captured video frame, such as "$F_i$", from a group of consecutively captured video frames, such as "$F_{i-2}$" to "$F_{i+2}$", when the location information, such as "$L_{i-2}$" to "$L_{i+2}$", associated with each of the group of consecutively captured video frames is detected unchanged. In accordance with an embodiment, the video processor 202 may be configured to select the at least one captured video frame, "$F_i$", when a difference between the location information of between video frames from the group of consecutively captured video frames, such as $((|L_{i-2}-L_{i-1}|), (|L_{i-1}-L_i|), (|L_i-L_{i+1}|)$, and $(L_{i+1}-L_{i+2}|))$, is below a first threshold value. In such cases, the video processor 202 may be configured to select the at least one captured video frame from the group of consecutively captured video frames along the generated path. The first threshold value may correspond to a coordinate value provided by the user, based on which the video processor 202 may select the at least one captured video frame. The video processor 202 may be further configured to include the selected at least one captured video frame as one of the frames in the generation of the video. An exemplary scenario of the selection of the at least one captured video frame from the group of consecutively captured video frames has been discussed later in conjunction with FIG. 3D.

In accordance with an embodiment, the video processor 202 may be further configured to select the captured video frame, "$F_i$", from the plurality of captured video frames, based on at least a focal distance parameter associated with each of the plurality of captured video frames. In accordance with an embodiment, the captured video frame, "$F_i$", may be selected when a change in focal distance parameter of the captured video frame, "$F_i$", with respect to a subsequent captured video frame, "$F_{i+1}$", is equal to or below the second threshold value. In accordance with an embodiment, the second threshold value may be automatically determined by the video processor 202. In accordance with an embodiment, the user may provide the second threshold value as one of the user input parameters.

In an exemplary scenario, the focal distance parameter of the captured video frame, "$F_i$", is, "20.7 mm". The focal distance parameter of the subsequent captured video frame, "$F_{i+1}$", is, "21.05 mm". Thus, the video processor 202 may determine the change in the focal distance parameter as, "0.35 mm". The change in the focal distance parameter is below the second threshold value, such as "0.4 mm". In such a case, the video processor 202 may select the captured video frame, "$F_i$". The video processor 202 may be configured to include the selected captured video frame, "$F_i$", as one of the frames in the generation of the video. In other words, only those video frames are selected for the video generation, that have a smooth change of focus point, so that the user's eyes do not get tired due to frequent switching of focal distance parameters of consecutive video frames. An exemplary scenario of the selection of the captured video frame, based on the focal distance parameter has been discussed later in conjunction with FIG. 3E.

A person with ordinary skill in the art will understand that, for brevity, the selection of one captured video frame for the generation of video has been explained for the embodiments, described above. Notwithstanding, the disclosure may not be so limited, and multiple frames may be selected for the generation of video, in accordance with corresponding embodiments, without departure from the scope of the disclosure.

FIGS. 3A to 3E illustrate exemplary scenarios to implement the disclosed method for video generation, in accordance with various embodiments of the disclosure. FIGS. 3A to 3E are explained in conjunction with elements from FIG. 1 and FIG. 2.

Figure 3A:
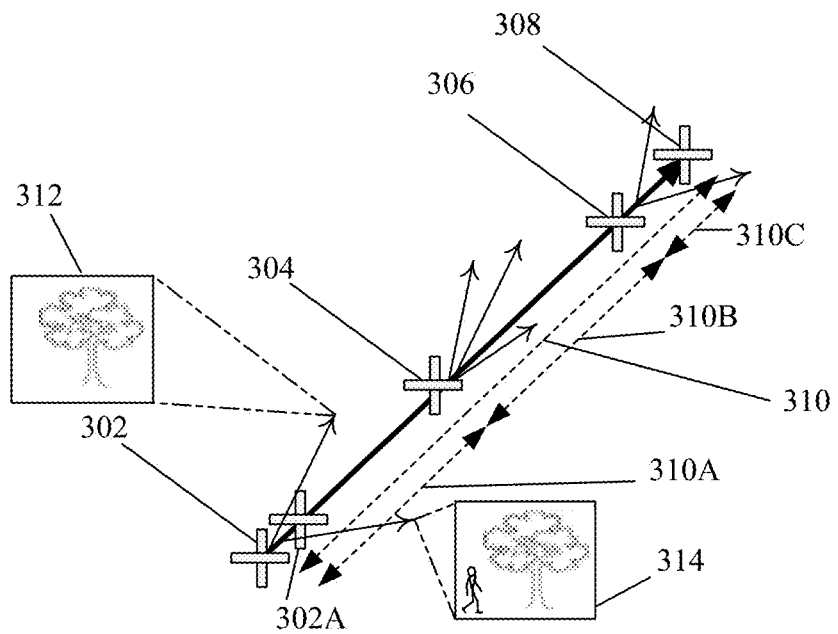
FIGS. 3A, 3B, 3C, 3D and 3E illustrate an exemplary scenario to implement the disclosed device and method for video generation, in accordance with an embodiment of the disclosure.

With reference to FIG. 3A, there is shown a first exemplary scenario. The first exemplary scenario comprises the video-capturing device 102, such as a helmet camera, worn by a user. The user, wearing the helmet camera, may travel from a first geographical location, such as a start location 302. The user may traverse one or more intermediate locations, such as a first intermediate location 304 and a second intermediate location 306, to reach a second geographical location, such as a target location 308. There is further shown a generated linear path 310 that comprises a first linear sub-path 310A, a second linear sub-path 310B, and a third linear sub-path 310C. While the user travels from the start location 302 to the target location 308, the helmet camera, worn by the user, may capture a plurality of video frames, such as a first video frame 312 and a second video frame 314.

The video processor 202 may be configured to determine location, direction, and gyro information (LDG) associated with the start location 302, the first intermediate location 304, the second intermediate location 306, and the target location 308. The LDG associated with the start location 302, the first intermediate location 304, the second intermediate location 306, and the target location 308 may be determined based on sensor data received from the sensing device 212, such as a GPS sensor, a compass sensor, gyro sensor, and/or the like.

With reference to the first exemplary scenario, the LDG information may be recorded for the plurality of captured video frames, as described in FIG. 2, while the user travels from the start location 302 to the first intermediate location 304. For example, the LDG information associated with the start location 302 and the first intermediate location 304, may be "28°42' 0" N, 77° 1' 48" E" and "28°42' 0" N, 77° 1'49" E", respectively.

Based on the LDG information for all the locations traversed between the start location 302 and the first intermediate location 304, the video processor 202 may generate the first linear sub-path 310A. With respect to a reference axis, the video processor 202 may determine the directional angle, "$\theta_{DA}$", for the first linear sub-path 310A, based on the sensor data provided by the compass sensors in the sensing device 212. In this case, the directional angle, "$\theta_{DA}$", may be "0 degree" since the first linear sub-path 310A corresponds to a linear path with zero curvature. The video processor 202 may be further configured to determine a camera angle, such as "0.01 degrees", of a first video frame 312, at the start location 302, and a time instance, "0.1 seconds". The comparator 206 may be configured to compare the camera angle, "0.01 degrees", at the start location 302 and the time instance, "0.1 seconds", with the directional angle, "0 degree". In an instance, the comparison between the camera angle, "0.01 degrees", and the directional angle, "0 degree", is approximately successful. In such a case, the video processor 202 may be configured to select the first video frame 312. The video processor 202 may be further configured to include the selected first video frame 312, as a first frame in the generated output video.

In another instance, the comparison between the camera angle, such as "10 degrees", of the second video frame 314 (at a location 302A near the start location 302, and the time instance, "0.5 seconds") and the directional angle, such as "0 degree", is not successful. In such a case, the video processor 202 may be configured to discard the captured second video frame 314. Accordingly, a first portion of the output video may be generated between the start location 302 and the first intermediate location 304 when the video processor 202 records LDG information for the plurality of captured video frames between the first intermediate location 304 and the second intermediate location 306. Similarly, a second portion of the output video may be generated between the first intermediate location 304 and the second intermediate location 306 when the video processor 202 records the LDG information for the plurality of captured video frames between the second intermediate location 306 and the target location 308. Similarly, the third portion of the output video may be generated between the second intermediate location 306 and the target location 308. The video processor 202 may combine the first, second, and third portions of the output video to generate a complete output video.

Figure 3B:
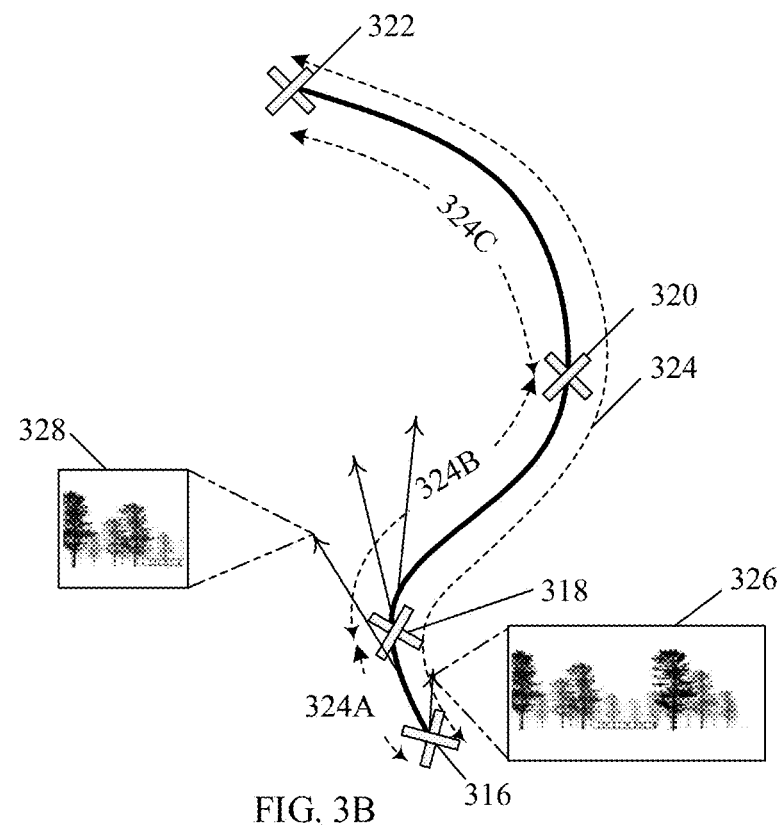

With reference to FIG. 3B, there is shown a second exemplary scenario. The second exemplary scenario comprises the video-capturing device 102, such as an ORVM camera, installed at a vehicle in motion. The vehicle with the ORVM camera may travel from a first geographical location, such as a start location 316. The user may traverse one or more intermediate locations, such as a first intermediate location 318 and a second intermediate location 320, to reach a second geographical location, such as a target location 322. There is further shown a first non-linear sub-path 324A between the start location 316 and the first intermediate location 318. There is further shown a second non-linear sub-path 324B between the first intermediate location 318 and the second intermediate location 320. There is further shown a third non-linear sub-path 324C between the second intermediate location 320 and the target location 322. The first non-linear sub-path 324A, the second non-linear sub-path 324B, and the third non-linear sub-path 324C are sub-paths of a generated non-linear path 324. There is further shown a first video frame 326 captured at the start location 316. There is further shown a second video frame 328 captured between the start location 316 and the first intermediate location 318.

The video processor 202 may determine location and direction information associated with the start location 316, the first intermediate location 318, the second intermediate location 320, and the target location 322, based on sensor data received from the sensing device 212, such as a GPS sensor and a compass sensor.

With reference to the second exemplary scenario, the location and direction information may be recorded for the plurality of captured video frames, as described in FIG. 2, while the vehicle travels from the start location 316 to the first intermediate location 318. Based on the location and direction information, the video processor 202 may be further configured to execute a curve fitting algorithm to generate the first non-linear sub-path 324A between the start location 316 and the first intermediate location 318.

The video processor 202 may be configured to compute a first vector that may correspond to direction information of a first video frame 326, captured at the start location 316 at a first time instance, "0.1 seconds". The video processor 202 may be further configured to compute a second vector that may correspond to a tangential vector at a curvature of the first non-linear sub-path 324A at the start location 316 and at the first time instance "0.1 seconds".

In accordance with an exemplary scenario, the video processor 202 may be configured to compute a first vector with an angle, such as "5 degrees", of the first video frame 326. The first video frame 326, captured at the start location 316, may correspond to the determined direction information of the captured video frame associated with the start location 316. The video processor 202 may be further configured to compute a second vector with an angle, such as "2 degrees", that may correspond to a tangential vector to the generated first non-linear sub-path 324A, at the start location 316, of the first video frame 326. The video processor 202 may be configured to determine an angle, such as "3 degrees", between the first vector and the second vector. In accordance with the exemplary scenario, a pre-defined threshold angle may be "5 degrees".

Accordingly, the determined angle, such as "3 degrees", is less than the pre-defined threshold angle, such as "5 degrees". The video processor 202 may be configured to select the first video frame 326. The video-capturing device 102 may be further configured to include the selected first video frame 326, in the generated output video.

At a second time instance, "0.5 seconds", the video processor 202 may be configured to compute another first vector with an angle, such as "15 degrees", that may correspond to direction information of the second video frame 328. The second video frame 328 is captured at a location between the start location 316 and the first intermediate location 318. The video processor 202 may be further configured to compute a second vector with an angle, such as "6 degrees", that may correspond to a tangential vector at a curvature of the first non-linear sub-path 324A at the location at the second time instance "0.5 seconds". The video processor 202 may be further configured to determine an angle, such as "9 degrees", between the first vector and the second vector.

Accordingly, for the captured second video frame 328, the determined angle, such as "9 degrees", is greater than the pre-defined threshold angle, such as "5 degrees". The video processor 202 may be configured to discard the second video frame 328. Consequently, the second video frame 328 may not be included in the generated output video. Accordingly, a first portion of the output video, that includes the first video frame 326, may be generated between the start location 316 and the first intermediate location 318, when the video processor 202 generates the second non-linear sub-path 324B. Similarly, a second portion of the output video may be generated between the first intermediate location 318 and the second intermediate location 320, when the video processor 202 generates the third non-linear sub-path 324C. Similarly, the third portion of the output video may be generated between the second intermediate location 320 and the target location 322. The video processor 202 may combine the first, second, and third portion of the output video to generate a complete output video.

Figure 3C:
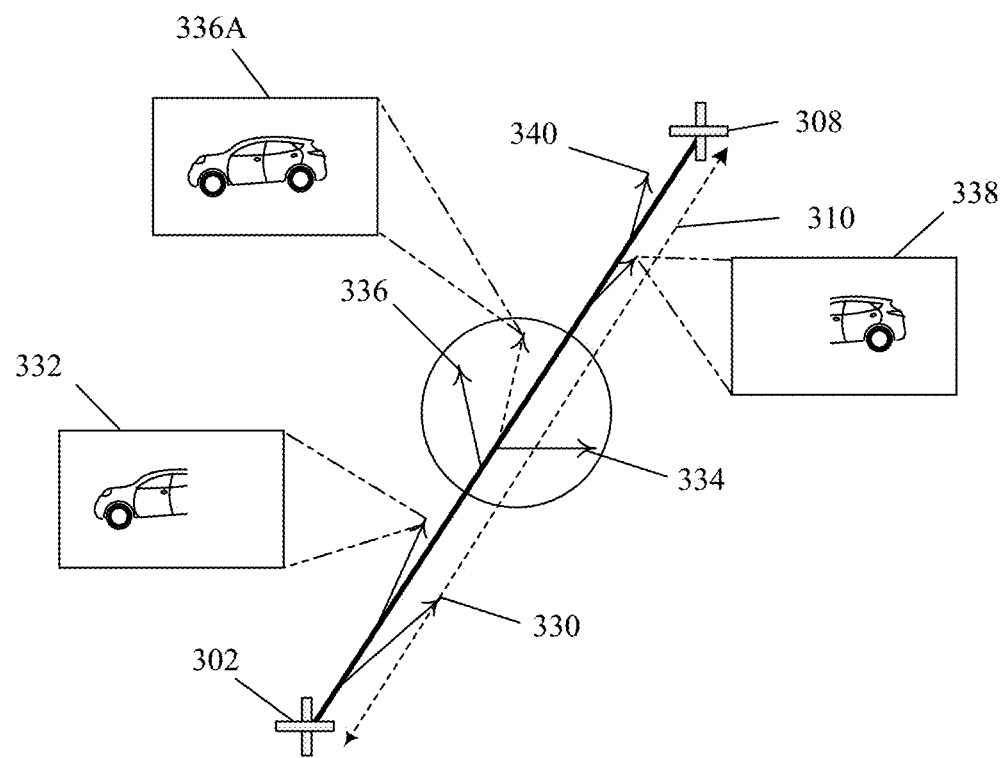

With reference to FIG. 3C, there is shown a third exemplary scenario. The third exemplary scenario comprises the video-capturing device 102, such as a non-stationary action camera, installed in a sports stadium to record a sports event, such as a car race.

With reference to the third exemplary scenario, the non-stationary action camera may traverse a linear path with zero curvature for particular time duration. For such time duration, the video processor 202 generates the linear path 310 between the start location 302 and the target location 308. A plurality of video frames, 330 to 340, may be captured. However, there may be multiple instances when the comparison between the camera angles of the plurality of consecutive captured video frames, such as 334 and 336 (as encircled in FIG. 3C), and the directional angle is not successful.

Accordingly, the video processor 202 may discard the plurality of consecutive captured video frames, such as 334 and 336. In such a case, the video processor 202 may utilize the captured video frames 332 and 338, to generate a composite video frame 336A, along the generated linear path 310. Such composite video frame 336A may substitute the discarded video frames 334 and 336. In such a case, the captured video frames 332 and 338, should comprise at least one common object, such as a car. The captured video frame 332 may include a first part of the car. The captured video frame 338 may include a second part of the car. The first part and the second part may include a common part of the at least one common object. In such a case, the video processor 202 may generate the composite video frame 342 by use of the captured video frames 332 and 338.

Figure 3D:
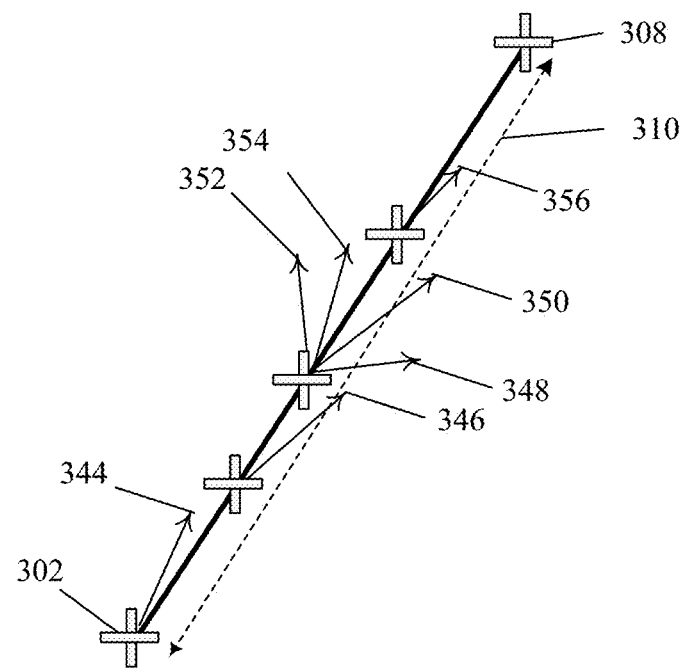

With reference to FIG. 3D, there is shown a fourth exemplary scenario. The fourth exemplary scenario comprises the video-capturing device 102, such as an exterior car camera, installed in a car. With reference to the fourth exemplary scenario, the exterior car camera may traverse the linear path 310. Notwithstanding the disclosure may not be limited, and the non-linear path 324 may also be traversed by the exterior car camera between the start location 316 and the target location 322, without deviation from the scope of the disclosure. A plurality of video frames 344 to 356, correspond to specific locations and may be captured during the time duration. The plurality of video frames, such as the video frames 344 to 356, may be captured at consecutive time instances, "0 second to 6 seconds".

At time instance, "0 second", the video frame 344 may be captured at a first location. The video frame 344 is selected to be used in the generation of the output video. At time instance, "1 second", the video frame 346 may be captured at a second location. The second location is different from the first location. The video frame 346 is selected to be used in the generation of the output video. At time instance, "2 seconds", the video frame 348 may be captured at a third location. The third location is different from the second location. The video frame 348 is selected to be used in the generation of the output video. At time instance, "3 seconds", the video frame 350 may be captured at the third location. The location for the video frame 350 is the same as the location for the video frame 348. The video frame 350 is not selected to be used in the generation of the output video. Similarly, at time instances, "4 seconds", and "5 seconds", the video frames 352 and 354 may be captured at the third location only. The locations for the video frames 352 and 354 are the same as the location for the video frame 350. Therefore, the video frames 352 and 354 are not selected to be used in the generation of the output video. At time instance, "6 seconds", the video frame 356 may be captured at a fourth location. The fourth location is different from the third location. The video frame 356 is selected to be used in the generation of the output video.

Thus, the video processor 202 may be configured to select the at least one captured video frame, such as the video frame 348, from the group of consecutively captured video frames 348 to 354, when the location information, associated with each of the group of consecutively captured video frames 348 to 354, is detected unchanged. In accordance with an embodiment, the video processor 202 may be configured to select the at least one captured video frame 350. This may occur when a difference between the location information of two video frames of the group of consecutively captured video frames is below a first threshold value. In such cases, the video processor 202 may be configured to select at least one captured video frame from the group of consecutively captured video frames along the generated path. The first threshold value may correspond to a coordinate value provided by the user, based on which the video processor 202 may select the at least one captured video frame. The video processor 202 may be further configured to include the selected at least one captured video frame as one of the video frames in the generated video.

Figure 3E:
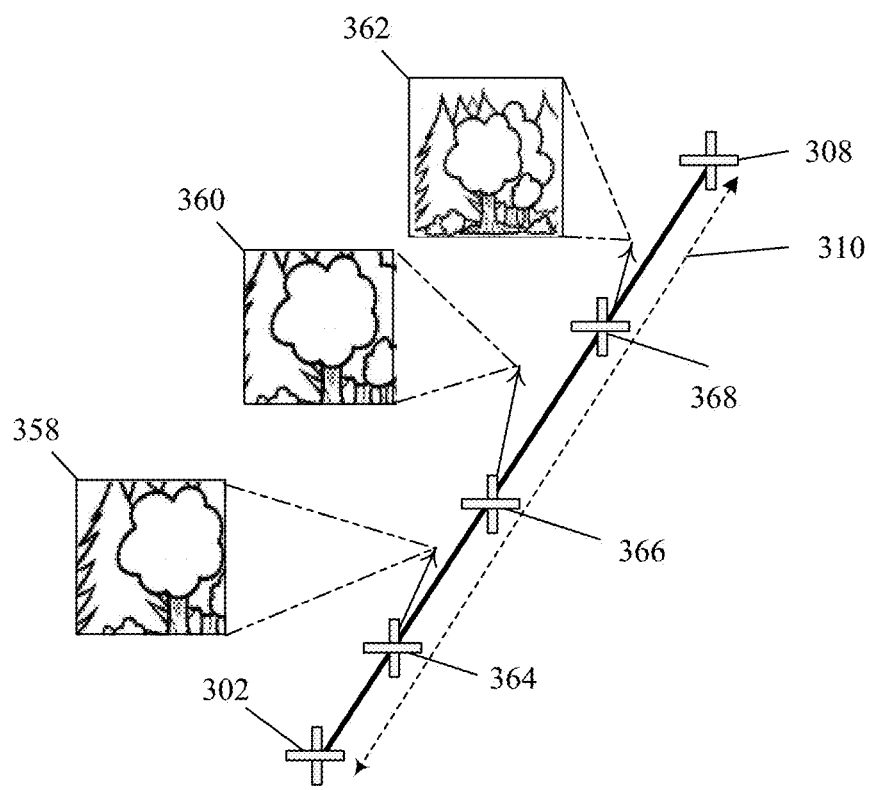

With reference to FIG. 3E, there is shown a fifth exemplary scenario. The fifth exemplary scenario comprises three captured video frames 358, 360, and 362 captured by the video-capturing device 102, such as a DSLR camera. Each of the three captured video frames 358, 360, and 362, are associated with a first location 364, a second location 366, and a third location 368, respectively, along a linear path 310 generated between the start location 302 and the target location 308. Notwithstanding the disclosure may not be limited, and the non-linear path 324 may also be traversed by the exterior car camera between the start location 316 and the target location 322, without deviation from the scope of the disclosure. The first location 364, the second location 366, and the third location 368 are represented as "28° 42' 5" N, 77° 1' 55" E", "28° 42' 0" N, 77° 1' 50" E", and "28° 42' 0" N, 77° 4' 49" E", respectively.

In accordance with the fifth exemplary scenario, two captured video frames 358 and 360, include one or more common objects. The video processor 202 may determine a difference value between the first location 364 and the second location 366 to be "0° 0' 5" N, 0° 0' 5" E". Further, the comparator 206 may be configured to compare the difference value between the first location 364 and the second location 366 with the first threshold value, such as "0° 0' 5" N, 0° 0' 5" E". Based on the comparison, the video processor 202 may determine that the difference between the first location 364 and the second location 366 is equal to the first threshold value. In such a case, the video processor 202 may be configured to select any one captured video frame from the two captured video frames, 358 and 360. For example, the video processor 202 selects the captured video frame 360. Further, in accordance with an embodiment, the video processor 202 may be configured to include the selected at least one captured video frame 360 as one of the frames in the generated video.

In accordance with another embodiment, the video processor 202 may be further configured to select the captured video frame 360, from the plurality of captured video frames 358 to 362, based on at least a focal distance parameter associated with each of the plurality of captured video frames. For example, a first focal distance parameter for the video frame 360 captured at a first time instance, such as "0.1 second", is, "48 mm". Further, a second focal distance parameter for the video frame 362 subsequently captured at a second time instance, such as "0.2 seconds", is, "50 mm". Accordingly, the change in focal distance parameter of the captured video frame 360, with respect to the subsequently captured video frame 362, is "2 mm". In such a case, the change in focal distance parameter is below the second threshold value, such as "5 mm". In such a case, the video processor 202 selects the captured video frame 362 and includes the selected captured video frames 360 and 362 in the generated video.

Figure 4A:
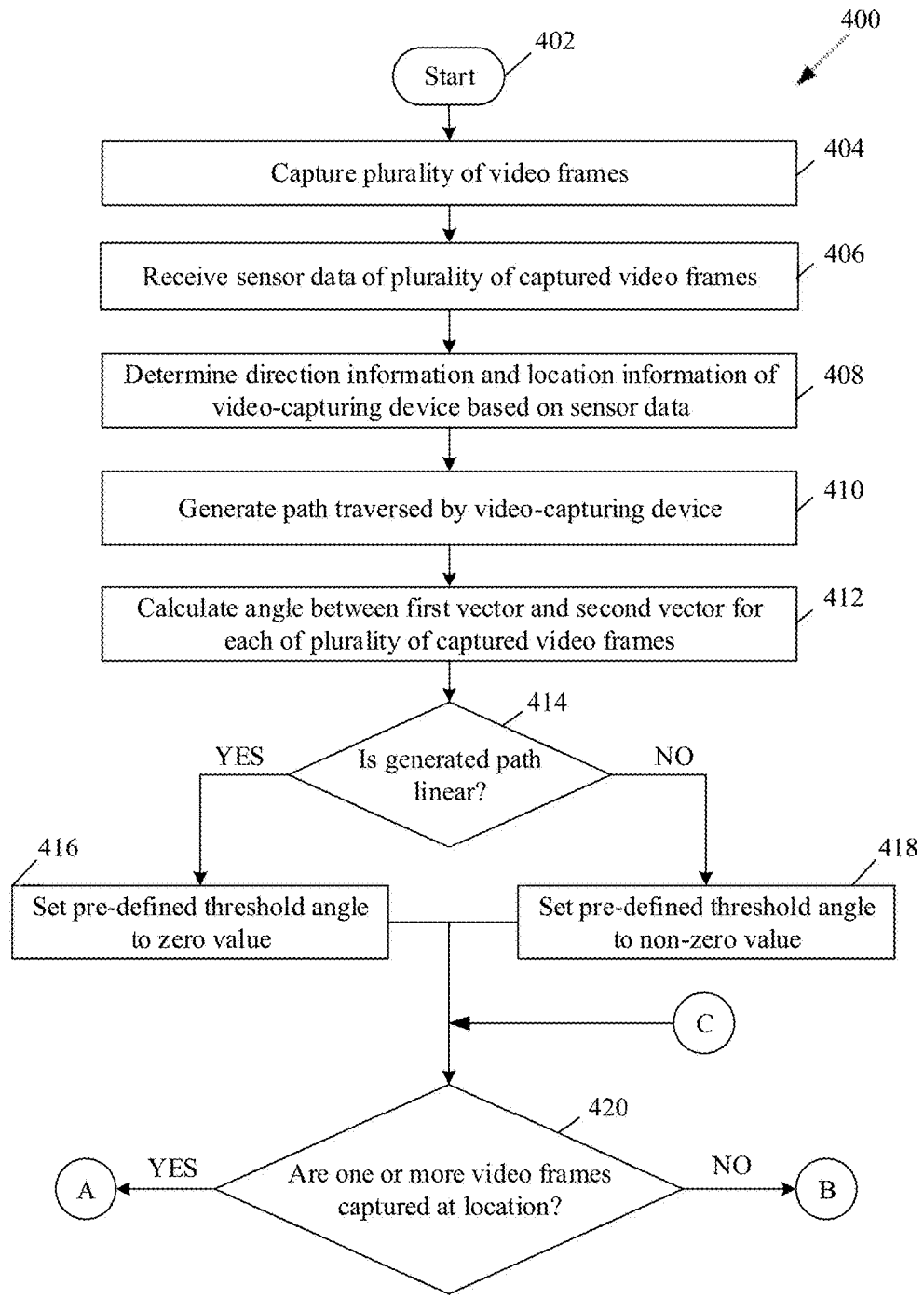
FIGS. 4A, 4B, and 4C collectively depict a flowchart that illustrates a method for video generation, in accordance with an embodiment of the disclosure.
Figure 4B:
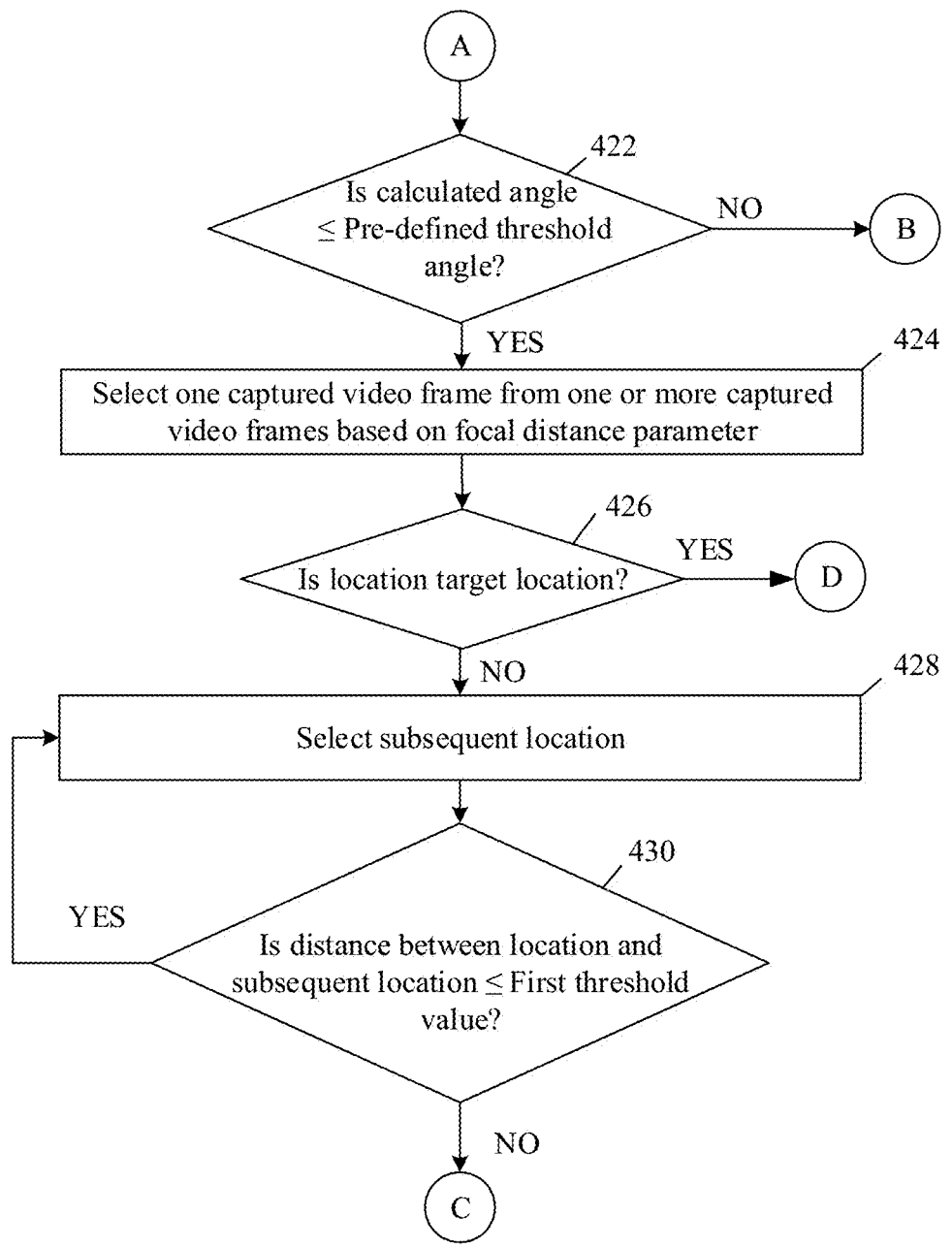
Figure 4C:
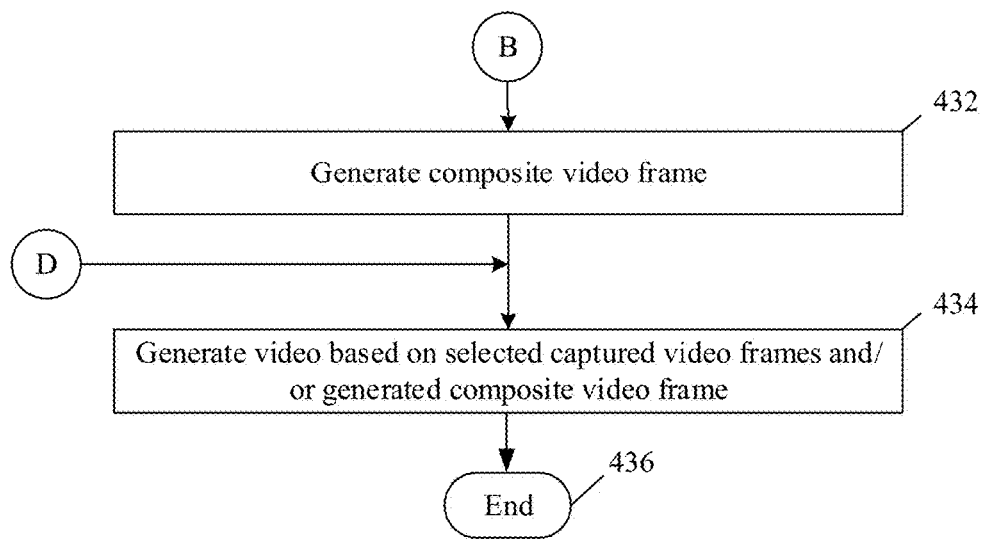

FIGS. 4A, 4B, and 4C collectively depict a flow chart that illustrates a method for video generation, in accordance with an embodiment of the disclosure. With reference to FIGS. 4A, 4B, and 4C, there is shown a flow chart 400. The flow chart 400 is described in conjunction with FIGS. 1, 2, and 3A to 3E. The method starts at step 402 and proceeds to step 404.

At step 404, a plurality of video frames may be captured by the video-capturing device 102. At step 406, sensor data associated with each of the plurality of video frames may be received from the sensing device 212. At step 408, direction and location information of the video-capturing device 102 for the plurality of captured video frames may be determined based on the received sensor data.

At step 410, a path traversed by the video-capturing device 102 may be generated. The video processor 202 may generate the path, based on the determined location information. The generated path may correspond to a linear path, a non-linear path, or a combination thereof. At step 412, an angle between a first vector and a second vector may be calculated for each of the plurality of captured video frames. The first vector may correspond to the determined direction information associated with each of the plurality of captured video frames. The second vector may correspond to a tangential vector at the location along the generated path.

At step 414, it may be determined whether the generated path corresponds to the linear path or the non-linear path. In instances where the generated path corresponds to the linear path, the control passes to step 416. In instances where the generated path corresponds to the non-linear path, the control passes to step 418.

At step 416, a pre-defined threshold angle may be set to a zero value when the generated path corresponds to the linear path. The control passes to step 420. At step 418, a pre-defined threshold angle may be set to a non-zero value when the generated path corresponds to the non-linear path. In accordance with an embodiment, the video processor 202 may extract the non-zero value of the pre-defined threshold angle from the memory 204 (or the database server 104). In accordance with an embodiment, the non-zero value of the pre-defined threshold angle may be provided by the user.

At step 420, it may be determined whether one or more captured video frames are available at a location (such as a start location). In instances where the plurality of captured video frames is available at the location, the control passes to step 422. In instances where the plurality of captured video frames is not available at the location, the control passes to step 432.

At step 422, it may be determined whether the calculated angle of each of the plurality of captured video frames associated with the location is equal to or less than the pre-defined threshold angle. In instances where the calculated angle of at least one captured video frame from the plurality of captured video frames is equal to or less than the pre-defined threshold angle, the control passes to step 424. In instances where the calculated angle of each of the plurality of captured video frames is greater than the pre-defined threshold angle, the control passes to step 432.

At step 424, one captured video frame may be selected for the location from the one or more captured video frames associated with the location. In accordance with an embodiment, the video processor 202 may select the one captured video frame, based on the magnitude of difference between the calculated angle and the pre-defined threshold angle. In accordance with an embodiment, the video processor 202 may select the one captured video frame, based on a focal distance parameter of the one captured video frame and a second threshold value, such that there is a uniform change in the focal distance parameter between two consecutively captured video frames.

At step 426, it may be determined whether the location is the target location. In instances where the location is not the target location, the control passes to step 428. In instances where the location is the target location, the control passes to step 434. At step 428, a subsequent location may be selected.

At step 430, it may be determined whether the distance between the location and the subsequent location is equal to or less than the first threshold value. In instances where the subsequent location is equal to or less than the first threshold value, the control passes back to step 428. In instances where the subsequent location is greater than the first threshold value, the control passes back to step 420.

At step 432, a composite video frame may be generated. The video processor 202 may generate the composite video frame, based on at least two video frames captured at the location or in a vicinity of the location. The location may correspond to one or more of a previous location, a current location, and/or a next location. At step 434, a video may be generated, based on the selected captured video frames and/or the generated composite video frames. Control passes to end step 436.

In accordance with an embodiment of the disclosure, the video-capturing device 102 (FIG. 1) may be configured to generate a video. The video-capturing device 102 may comprise one or more processors, such as the video processor 202 (FIG. 2). The video processor 202 may be configured to determine direction and location information of the video-capturing device 102 for a plurality of captured video frames. The video processor 202 may be further configured to generate a path traversed by the video-capturing device 102, based on the determined location information. The video processor 202 may be further configured to calculate an angle for each of the plurality of captured video frames. Further, the video processor 202 may be configured to select one or more video frames from the plurality of captured video frames, based on at least the calculated angle.

Various embodiments of the disclosure may provide a non-transitory computer readable medium and/or storage medium, and/or a non-transitory machine readable medium and/or storage medium with a machine code and/or a computer program stored thereon that has at least one code section executable by a machine and/or a computer to process a plurality of captured video frames for video generation. The at least one code section in an electronic device may cause the machine and/or computer to perform one or more steps comprising determination of direction and location information of the video-capturing device 102 for the plurality of captured video frames. A path traversed by the video-capturing device 102 may be generated, based on the determined location information. An angle for each of the plurality of captured video frames may be calculated. Based on at least the calculated angle, one or more video frames from the plurality of captured video frames may be selected.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enables the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A device for video generation, said device comprising:
one or more circuits configured to:
determine direction information and location information of said device in motion for a plurality of captured video frames;
generate a path of said device in said motion based on said determined said location information;
calculate, for a captured video frame from said plurality of captured video frames, an angle between a first vector that corresponds to said determined direction information associated with said captured video frame and a second vector that corresponds to said generated path; and
select said captured video frame, for generation of a video, based on at least said calculated angle.

2. The device according to claim 1, wherein said one or more circuits are further configured to generate a composite video frame for a location along said generated path based on at least two video frames captured at said location or within a distance from said location, wherein each of said at least two captured video frames includes at least a part of one or more common objects.

3. The device according to claim 2, wherein said one or more circuits are further configured to utilize said determined direction information associated with each of said at least two captured video frames for said generation of said composite video frame.

4. The device according to claim 3, wherein said one or more circuits are configured to generate said composite video frame for said generation of said video in absence of a video frame that corresponds to said location along said generated path.

5. The device according to claim 1, wherein said one or more circuits are further configured to select at least one captured video frame from a group of consecutively captured video frames along said generated path, wherein said at least one captured video frame is selected based on said location information associated with each of said group of consecutively captured video frames that is detected unchanged or is below a first threshold value, wherein said at least one captured video frame is included in said generated video.

6. The device according to claim 5, wherein said one or more circuits are configured to select said at least one captured video frame from said group of consecutively captured video frames along said generated path based on each of said group of consecutively captured video frames that include at least one common object.

7. The device according to claim 1, wherein said one or more circuits are further configured to select said captured video frame from said plurality of captured video frames based on at least a change in focal distance parameter associated with said captured video frame.

8. The device according to claim 1, wherein said one or more circuits are further configured to receive sensor data from one or more sensors, wherein said sensor data includes at least said direction information and said location information associated with each of said plurality of captured video frames.

9. The device according to claim 8, wherein said received sensor data corresponds to at least one of: a speed value, a rate-of-change of speed, an orientation of said device, global positioning system (GPS) data, geomagnetic sensor data, gyroscope sensor data, or other sensor data received from said one or more sensors in said device.

10. The device according to claim 9, wherein said one or more sensors comprise at least one of: one or more acceleration sensors, one or more gravity sensors, one or more gyroscope sensors, one or more linear acceleration sensors, or one or more geomagnetic field sensors.

11. The device according to claim 1, wherein said generated path corresponds to a linear path for said device in said motion, wherein said plurality of captured video frames are selected between a start location and a target location along said linear path based on said calculated angle for each of said plurality of captured video frames that is zero.

12. The device according to claim 1, wherein said generated path corresponds to a non-linear path for said device in said motion, wherein said plurality of captured video frames are selected between a start location and a target location along said non-linear path based on said calculated angle for each of said plurality of captured video frames that is equal to or below a threshold angle.

13. A method for video generation, said method comprising:
in a device:
determining direction information and location information of said device in motion for a plurality of captured video frames;
generating a path of said device in said motion based on said determined said location information;
calculating, for a captured video frame from said plurality of captured video frames, an angle between a first vector that corresponds to said determined said direction information associated with said captured video frame and a second vector that corresponds to said generated path; and
selecting said captured video frame, for generation of a video, based on at least said calculated angle.

14. The method according to claim 13, further comprising generating a composite video frame for a location along said generated path based on at least two video frames captured at said location or within a distance from said location, wherein each of said at least two captured video frames includes at least a part of one or more common objects.

15. The method according to claim 14, further comprising utilizing said direction information associated with each of said at least two captured video frames for said generation of said composite video frame.

16. The method according to claim 15, wherein said composite video frame is generated for said generation of said video in absence of a video frame at said location along said generated path.

17. The method according to claim 13, further comprising selecting at least one captured video frame from a group of consecutively captured video frames along said generated path based on said location information associated with each of said group of consecutively captured video frames that is detected unchanged or is below a first threshold value, wherein said at least one captured video frame is included in said generated video.

18. The method according to claim 17, wherein said at least one captured video frame is selected from said group of consecutively captured video frames captured along said generated path based on each of said group of consecutively captured video frames that include at least one common object.

19. The method according to claim 13, further comprising selecting said captured video frame from said plurality of captured video frames based on at least a focal distance parameter associated with said plurality of captured video frames.

20. The method according to claim 19, wherein said captured video frame is selected based on a change in the focal distance parameter of said captured video frame with respect to a subsequent captured video frame that is equal to or below a second threshold value.

21. A non-transitory computer-readable storage medium having stored thereon, a set of computer-executable instructions for causing a computer to perform operations, the operations comprising:
- determining direction information and location information of a device in motion for a plurality of captured video frames;
- generating a path of said device in said motion based on said determined said location information;
- calculating, for a captured video frame from said plurality of captured video frames, an angle between a first vector that corresponds to said determined said direction information associated with said captured video frame and a second vector that corresponds to said generated path; and
- selecting said captured video frame, for generation of a video, based on at least said calculated angle.

* * * * *